United States Patent Office 3,068,232
Patented Dec. 11, 1962

3,068,232
PROCESS FOR THE PREPARATION OF PIPERAZINES
Philip H. Moss, Austin, Tex., assignor to Jefferson Chemical Company, Inc., Houston, Tex., a corporation of Delaware
No Drawing. Filed Nov. 18, 1957, Ser. No. 696,915
6 Claims. (Cl. 260—268)

This invention relates to the preparation of piperazines and, more particularly, to a method for preparing piperazines from simple and substituted ethylene glycol. This application is a continuation-in-part of my application Serial No. 585,930 filed May 21, 1956.

According to this invention, there is provided a process for producing piperazines which comprises reacting a glycol with ammonia in contact with hydrogen and a hydrogention catalyst, said glycol being represented by:

(a) Compounds having the formula:

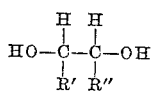

in which R' and R" are selected from the group consisting of hydrogen and an alkyl radical, and (b) Compounds having the above-noted formula (a) in which R' and R" are interconnected to form a dihydroxycycloaliphatic compound. Ordinarily, the reaction is conducted at a temperature between 150° C. and 400° C., and a pressure between 30 and 400 atmospheres is employed.

In carrying out this invention, a glycol, such as ethylene glycol, propylene glycol, 1,2-butylene glycol, and cyclohexane 1,2-diol is reacted with ammonia in the presence of hydrogen and a hydrogenation catalyst to produce a piperazine. The term "piperazines" as employed herein is used in the generic sense and is meant to include the compound from which the name is derived and the carbon-substituted alkyl derivatives thereof. Thus, for example, this term includes piperazine and its mono-, di-, tri-, and tetraalkyl derivatives. In general, the substituted group will be a lower alkyl radical. It is important to note that only those glycols having their hydroxyl radicals attached to a primary or a secondary carbon atom are suitable for this reaction.

The process of this invention is generally conducted at an elevated temperature and under superatmospheric pressure. The reaction temperature may be between 150° C. to 400° C. although it has been found preferable to operate in the relatively narrow temperature range between 200° C. and 300° C. Desirably, the process is conducted under relatively high pressure ranging from 30 to 400 atmospheres. As a general rule, however, the operating pressure will be between 65 and 225 atmospheres.

The presence of hydrogen is critical for the proper and efficient conduct of this process. While it is not necessary for hydrogen to constitute the entire atmosphere within the reaction vessel, it is necessary that the hydrogen partial pressure amount to a substantial part of the reaction atmosphere. Thus, the hydrogen should contribute at least 10 and preferably between 20 and 200 atmospheres of pressure to the total pressure in the system. Generally, the reaction vessel is swept clean with hydrogen gas and, thereafter, a predetermined amount of hydrogen pumped into the sealed vessel. When the vessel is subsequently heated to bring it up to reaction temperature, the hydrogen and reactants contained therein will bring the total pressure into the operating range indicated above.

A large number of hydrogenation catalysts may be employed in this process. Such catalysts, also known as hydrogenation-dehydrogenation catalysts, include one or more of the metals from the group including copper, nickel, cobalt, chromium, molybdenum, manganese, platinum, palladium and rhodium and the oxides of these metals. The metals or their oxides may be employed in combination with the normally non-reducible oxides such as chromium oxide, $Cr_2O_3$, molybdenum oxide, $Mo_2O_3$ and manganese oxide, MnO. The amount of the non-reducible oxide employed may be varied considerably but preferably should be minor. The preferred catalysts, that is those most effective for the reaction, are the metals or oxides of copper, nickel, cobalt and chromium. A particularly satisfactory catalyst is one in which the active components consist essentially of 75 mol percent nickel, 22 mol percent copper and 1.6 mol percent chromium. This catalyst may readily be prepared by ignition of a mixture of the corresponding nitrate salts followed by a reducing treatment.

The catalyst may be carried on an inert support such as silica, Filtros and alumina and is suitable either with or without a support for use in a batch process or in a fixed-bed continuous flow system. In a batch process, the amount of catalyst generally employed is between about 5% and 20% of the weight of the glycol.

In the event that the catalyst is in the metal oxide form, it may be introduced directly into the reaction zone or prereduced and subsequently introduced into the reaction zone. Both methods are suitable since the reaction is conducted under reducing conditions.

The aforementioned catalysts may be modified to obtain improved results. Thus, suitable modifiers or catalyst stabilizers, such as sodium and potassium sulfate, may be deposited on the catalyst. These are generally effective for prolonging the catalyst life.

The ratio of reactants, that is, the ratio of ammonia to glycol has an important effect on the efficiency of the process. Thus, while the process may be conducted by reacting equal molar amounts of ammonia and glycol, it has been observed that, if there is a molar excess of ammonia, the yields of the desired product are sharply increased. Optimum yields are obtained when the molar ratio of ammonia to glycol is in the order of about 3:1. The molar ratio should advantageously be at least 1.5:1 and may range as high as 10:1. The actual increase in yield produced by the employment of a substantial molar excess of ammonia has been observed at times to be as much as 50% or more over the yield obtained without an excess of ammonia.

This process may be conducted in either a batch or continuous-flow procedure. The following examples illustrate the practice of this invention.

EXAMPLE I

Preparation of Dimethyl Piperazine

Two mols of propylene glycol and 2.12 mols of anhydrous ammonia were heated at 257 to 260° C. for six hours under 2500 p.s.i.g. (pounds per square inch gauge) of hydrogen in the presence of 20 grams of a copper oxide-chromic oxide-nickel oxide catalyst. 51.9% of the propylene glycol was converted to dimethyl piperazine.

EXAMPLE II

2,3,5,6-Tetramethyl Piperazine 38 grams of ammonia, 201 g. of 2,3-butylene glycol and 17 g. of Raney nickel were charged to an autoclave to which hydrogen was then admitted under pressure. The vessel was heated to 215–223° C. for 6.3 hours during which period the reaction pressure registered in the range of 2000–2700 p.s.i.g. On distillation of the product, a 67.5% yield of 2,3,5,6-tetramethyl piperazine, boiling range 175–182° C. was obtained. The 2,3-butylene glycol had substantially all reacted. 3-amino-2 butanol and tetramethylpyrazine, boiling point 188–9° C., were found as minor by-products of the reaction.

EXAMPLE III

Piperazine 124 g. (2.0) mols of ethylene glycol, 68 g. of ammonia and 20 g. of copper-nickel-chromia catalyst (previously reduced by hydrogen at 250° C.) were charged to an autoclave to which hydrogen was then admitted under pressure. The vessel was heated at 242–248° C. for two hours during which time the pressure remained at about 3000 p.s.i.g. On distillation of the product, it was found that 72% of the ethylene glycol had reacted and that piperazine, boiling range 145–147° C., had been produced in 31% yield.

EXAMPLE IV

Catechol (110 g., one mol) was dissolved in 100 grams of water and was reduced at 135–175° C. and 1000 p.s.i.g. hydrogen pressure in presence of copper, nickel and chromium oxide, forming 1,2-cyclohexanediol. Without removing it from the autoclave, five mols of ammonia were added and the pressure adjusted to 300 p.s.i.g. at 40° C. The reaction was carried out at 240° C. for two hours. Contents of the pressure vessel were filtered hot to remove catalyst and then distilled to recover 0.26 mols of perhydrophenazine, B.P. 126–130° C. at 4 mm. The perhydrophenazine was a mixture of isomers melting at 48–54° C. which on recrystallization melted at 126–131° C. (a-perhydrophenazine M.P. 132–133° C.). The perhydrophenazine titrated as a diamine, equivalent weight 97.8 (theory 97).

EXAMPLE V

To a rocking autoclave was charged 50 g. of 1,2-dodecanediol and 10 g. of prereduced nickel-copper-chromia catalyst. The autoclave was closed, flushed with hydrogen, 34 g. of ammonia added and the pressure brought to 500 p.s.i.g. with hydrogen. The reaction mixture was rocked at 270° C. and 3400 p.s.i.g. for three hours. Hot isopropyl alcohol dissolved the product and catalyst was removed by filtration. The reaction product was distilled at 2 mm. and a substantial yield of didecylpiperazine was obtained from the fraction boiling in the range 150–225° C.

Obviously many modifications and variations of the invention, as hereinbefore set forth, may be made without departing from the spirit and scope thereof, and therefore only such limitations should be imposed as are indicated in the appended claims.

I claim:

1. A process for preparing alkyl piperazines which comprises reacting a glycol of the formula:

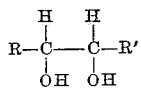

wherein R and R' are selected from the group consisting of hydrogen and 1 to 12 carbon atoms alkyl radicals, with ammonia in the presence of hydrogen at an effective elevated temperature within the range of about 150° to about 400° C., under a superatmospheric pressure sufficient to maintain liquid phase reaction and in the presence of a catalyst of the class consisting of nickel and cobalt hydrogenation catalysts.

2. A process for preparing a piperazine compound which comprises reacting a glycol with from about 1.5 to about 10 mols of ammonia per mol of glycol in contact with hydrogen and a hydrogenation catalyst selected from the group consisting of copper, nickel and cobalt hydrogenation catalysts at a temperature within the range of about 150° C. to about 400° C. and a super atmospheric pressure within the range of about 30 to about 400 atmospheres, including a hydrogen partial pressure within the range of about 20 to about 200 atmospheres to form a reaction product containing a piperazine compound corresponding to the glycol starting material and recovering said piperazine compound, said glycol having the formula:

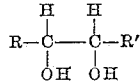

wherein R and R' are selected from the group consisting of hydrogen and 1 to 12 carbon atom alkyl radicals.

3. A method as in claim 2 wherein the temperature is within the range of about 200° to about 300° C., and the reaction pressure is within the range of about 65 to about 225 atmospheres.

4. A method as in claim 3 wherein the glycol is ethylene glycol.

5. A method as in claim 3 wherein the glycol is propylene glycol.

6. A method as in claim 3 wherein the glycol is 2,3-butylene glycol.

References Cited in the file of this patent

UNITED STATES PATENTS

| | | |
|---|---|---|
| 2,519,560 | Fowler | Aug. 22, 1950 |
| 2,754,330 | Shreyer | July 10, 1956 |

OTHER REFERENCES

Fieser et al.: Organic Chemistry, second edition, pp. 66–68, 83, 107–108, 179, 227 (1950).

Guillaumin: Academie Des Sciences Comptes Rendus, vol. 234, 2076–2077 (1952).

Guillaumin: Academie Des Sciences Comptes Rendus, vol. 236, 1270–1271 (1953).